(12) United States Patent
Reed et al.

(10) Patent No.: US 8,196,175 B2
(45) Date of Patent: Jun. 5, 2012

(54) SELF-DESCRIBING AUTHORIZATION POLICY FOR ACCESSING CLOUD-BASED RESOURCES

(75) Inventors: David R. Reed, Seattle, WA (US); Eric S. Fleischman, Redmond, WA (US); Abolade Gbadegesin, Seattle, WA (US); Dharma Shukla, Sammamish, WA (US); Nikolay Smolyanskiy, Seattle, WA (US); Thomas A. Galvin, Amherst, NH (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 12/042,637

(22) Filed: Mar. 5, 2008

(65) Prior Publication Data
US 2009/0228950 A1 Sep. 10, 2009

(51) Int. Cl.
*G06F 17/00* (2006.01)
(52) U.S. Cl. ............ 726/1; 726/2; 726/3; 726/4; 726/10
(58) Field of Classification Search .................. 726/2, 3, 726/4, 10; 709/219
See application file for complete search history.

(56) References Cited

U.S. PATENT DOCUMENTS

| 5,517,569 | A | 5/1996 | Clark |
| 5,560,008 | A | 9/1996 | Johnson et al. |
| 5,999,711 | A | 12/1999 | Misra et al. |
| 6,725,376 | B1 | 4/2004 | Sasmazel et al. |
| 6,892,307 | B1 | 5/2005 | Wood et al. |
| 7,073,174 | B2 | 7/2006 | Volkoff et al. |
| 7,114,076 | B2 | 9/2006 | Callaghan |
| 7,178,163 | B2 | 2/2007 | Reeves et al. |
| 7,185,364 | B2 | 2/2007 | Knouse et al. |
| 7,234,157 | B2 | 6/2007 | Childs et al. |
| 7,243,369 | B2 | 7/2007 | Bhat et al. |
| 7,353,281 | B2 | 4/2008 | New et al. |
| 7,673,135 | B2 | 3/2010 | Chin et al. |
| 2002/0147929 | A1* | 10/2002 | Rose ............................ 713/201 |
| 2002/0165960 | A1 | 11/2002 | Chan |
| 2004/0003081 | A1* | 1/2004 | Justus et al. .................. 709/225 |
| 2004/0010603 | A1 | 1/2004 | Foster et al. |
| 2004/0139319 | A1 | 7/2004 | Favazza et al. |
| 2005/0193211 | A1* | 9/2005 | Kurose .......................... 713/185 |
| 2005/0256878 | A1 | 11/2005 | Brown et al. |
| 2006/0230430 | A1 | 10/2006 | Hondo et al. |
| 2007/0044146 | A1 | 2/2007 | Murase et al. |

(Continued)

OTHER PUBLICATIONS

Uzquiano, et al.,"Secure Applications in Multi-Domain Environment: Secure Desktop", Department of Computer and System Sciences, Stockholm, Mar. 2007, pp. 1-57.*

(Continued)

*Primary Examiner* — Kambiz Zand
*Assistant Examiner* — Abiy Getachew
(74) *Attorney, Agent, or Firm* — Mayer & Williams P.C.

(57) ABSTRACT

A ticketing system adapted for use with a cloud-based services platform is provided by a ticket-based authorization model in which the authorization requirements for traversing one or more meshes of resources associated with a cloud service are annotated in links included in a resource that refer to other resources. The meshes are thus self-describing with respect to the association among the resources (i.e., the links) as well as the authorization required to access resources. Resource access requires a principal ticket which asserts that a caller at a client (e.g., a security principal representing a device or identity associated with a user) is authenticated, plus zero or more claim tickets. The claim tickets make additional assertions about the caller that the cloud service may use to check that the caller is authorized to access the resource.

20 Claims, 5 Drawing Sheets

U.S. PATENT DOCUMENTS

| | | | |
|---|---|---|---|
| 2007/0100967 A1* | 5/2007 | Smith et al. | 709/219 |
| 2007/0107048 A1 | 5/2007 | Halls et al. | |
| 2007/0143829 A1 | 6/2007 | Hinton et al. | |
| 2007/0204166 A1 | 8/2007 | Tome et al. | |
| 2007/0260875 A1 | 11/2007 | Raghunath et al. | |
| 2007/0294404 A1 | 12/2007 | Boutboul | |
| 2008/0083031 A1 | 4/2008 | Meijer et al. | |
| 2008/0148351 A1* | 6/2008 | Bhatia et al. | 726/2 |

OTHER PUBLICATIONS

Arnab, et al., "Ticket Based Identity System for DRM", Department of Computer Science, University of Cape Town Rondebosch, South Africa, 2006, pp. 1-10.

Park, et al.,"A Ticket-Based AAA Security Mechanism in Mobile IP Network", Department of Computer Science and Engineering, Ewha Womans University, Seoul, Korea,vol. 2668, 2003, pp. 210-219.

Tang, Jian "Integrate Tivoli Access Manager with ObjectGrid to Authenticate and Authorize your Distributed Clients" Retrieved at <<http://www.ibm.com/developerworks/websphere/techjournal/0801_Jang/0801_Jang.html>> Jan. 23, 2008, p. 11.

Author Unknown, "Cloudware—Cloud Computing without Compromise", Retrieved at <<http://www.3tera.com/Cloud-computing/>>, Jul. 17, 2008, p. 3.

Kagal et al. "Self-describing Delegation Networks for the Web", Retrieved at <<http://people.csail.mit.edu/kagal/papers/kagal-delegation.pdf>>, p. 10.

Lesniewski-Laas et al, "Alpaca: Extensible Authorization for Distributed Services", Retrieved at <<http://pdos.csail.mit.edu/papers/alpaca-ccs07.pdf>>, CCS'07, Oct. 29-Nov. 2, 2007, Alexandria, p. 13.

Singh et al., "A Privacy, Trust and Policy based Authorization Framework for Services in Distributed Environments", Retrieved at <<http://www.waset.org/ijcsi/v2/v2-2-11.pdf>>, International Journal of Computer Science vol. 2, No. 2, pp. 85-92.

* cited by examiner

SELF-DESCRIBING AUTHORIZATION POLICY FOR ACCESSING CLOUD-BASED RESOURCES

BACKGROUND

During approximately the last 30 years, dramatic advances in technology—for example, the development of the minicomputer, the rise of the personal computer, and the emergence of the Internet—have revolutionized the way information is created, stored, shared, and used. Today, as technology continues to advance and improve, new breakthroughs are transforming the world once again. The foundation for the current transformation is the combination of an increasing diversity of ever more powerful devices, and the expanding data storage capacity in large scale networked data centers ("the cloud") that are accessed through the growing ubiquity of broadband networks that comprise the Internet. The capabilities of such technologies are supporting the movement of computing resources, including both consumer and business-oriented applications, from the desktop or enterprise environment out to the Internet as hosted services.

Under such a cloud-computing model, locally installed software on a client platform may be replaced, supplemented, or blended with a service component that is delivered over a network. Such models can often give customers more choices and flexibility by delivering software solutions and user experiences that can typically be rapidly deployed and accompanied by value-added services. Such solutions and experiences are delivered by the hosted service to various client platforms such desktop PCs (personal computers) or to portable devices like mobile phones or pocket PCs. In addition to providing application services, cloud-based computing can also typically provide data sharing and storage capabilities for users to access, collaborate in, and share rich data that leverages the global cloud computing footprint.

While service platforms in the cloud are expected to provide attractive, feature-rich solutions to customers that are well managed, robust, and cost-effective, it is desirable to have effective and efficient systems for determining how access to resources in the cloud will be controlled and managed for users and devices.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A ticketing system adapted for use with a cloud-based services platform is provided by a ticket-based authorization model in which the authorization requirements for traversing a mesh of resources associated with a cloud service are annotated in the links used by resources to refer to other resources. The meshes are thus self-describing with respect to the association (i.e., the links) between resources as well as the authorization required to access resources. Resource access employs a principal ticket which asserts that a caller at a client (e.g., a security principal representing a device or identity associated with a user) is authenticated, plus zero or more claim tickets. The claim tickets make additional assertions about the caller that the cloud service may use to check to determine that the caller is authorized to access the resource. The principal and claim tickets are signed so that their authenticity may be checked by the cloud service.

When a resource in a mesh requires a claim ticket for access, the requirement is expressed by including a URI (Universal Resource Identifier) that identifies where the claim ticket may be retrieved as an attribute on links to that resource. Optionally, a resource link may be arranged to include an inline value of the required claim ticket as an attribute which eliminates the extra step of retrieving the required claim ticket. By associating links to the resources with the authorization requirements for accessing the resources, a client can traverse a mesh and access its resources while obtaining the required claim tickets along the way. In the absence of an explicit claim ticket requirement, a caller need only supply its principal ticket when issuing a request against a resource in the service.

Claim tickets are typically optionally utilized within a given mesh, but can optimize performance by reducing the need for database lookups in the cloud when authorizing access to the resource by the client. However, when traversing neighboring meshes, a claim ticket will normally be used to establish peer connectivity. Claim tickets are identified by the URI of their associated resources so that they may be cached by a ticket manager at the client or in the cloud for subsequent use.

Advantageously, the present ticket-based authorization model decouples the authorization policy from the implementation of the client, the cloud service, and the resources themselves so that access control may be tightened or relaxed within a mesh or between meshes to meet the needs of a particular scenario. Thus, resource access authorization may be transformed in a way that is completely transparent to the service and its constituents. In addition, use of the model enables a client to be implemented in a straightforward manner that can navigate an arbitrary mesh without foreknowledge of what authorization is needed in order to do so.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
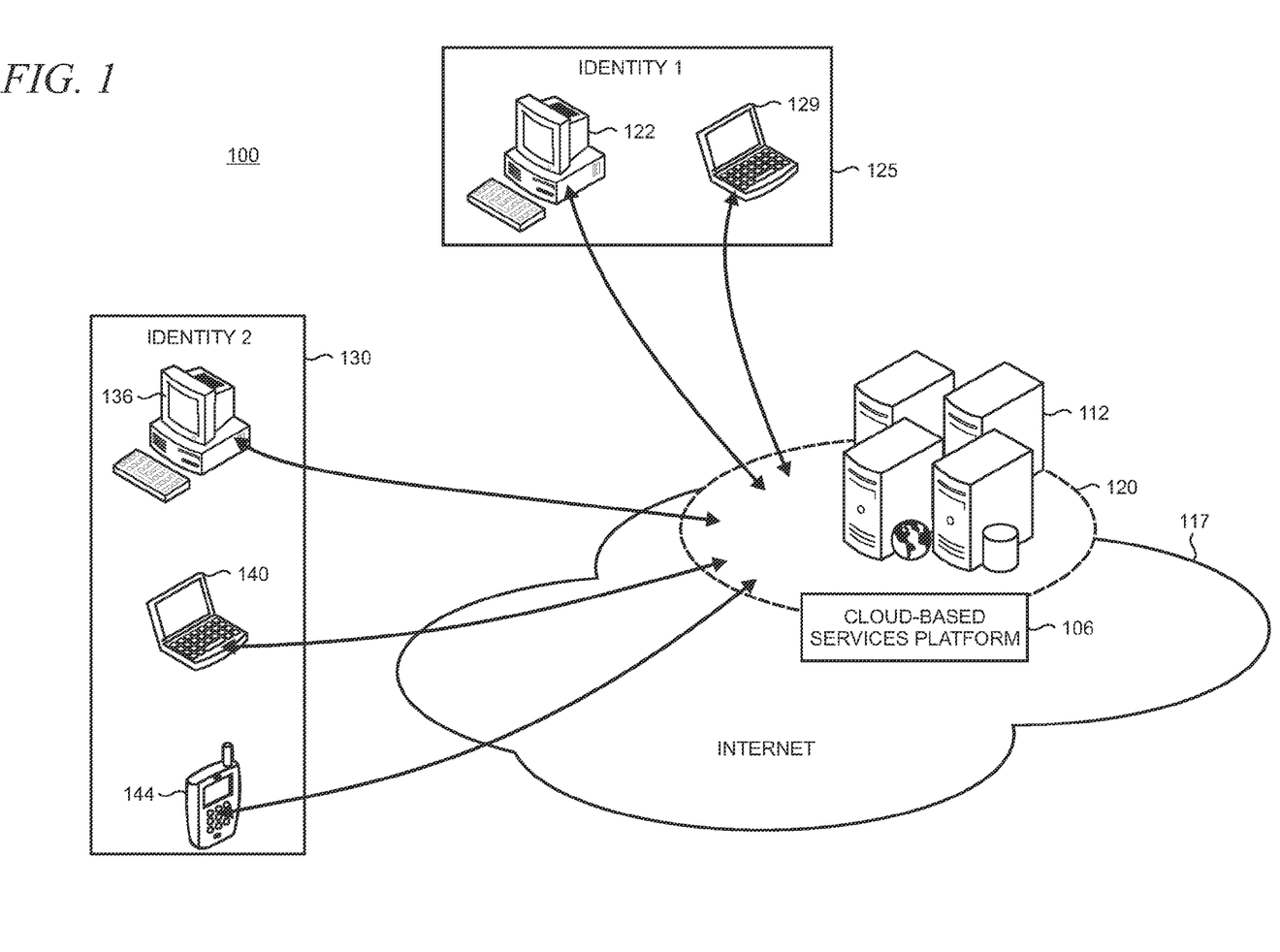
FIG. 1 shows an illustrative cloud-computing environment in which the present ticket-based authorization for handling requests for resources may be implemented.

FIG. 1 shows an illustrative cloud-computing environment 100 in which the present ticket-based authorization for handling requests for resources may be implemented. Environment 100 includes a cloud-based services platform 106 that exposes resources 112 to be accessed by client devices and users as services over a network such as the Internet 117. Cloud-computing services (hereinafter referred to as "cloud service(s)") are indicated in the abstract in FIG. 1 by the dashed oval 120. By utilizing typically large scale data centers and associated network infrastructure (which together form the "cloud"), the cloud-based services platform 106 may provide a virtualized computing application layer that supports an implementation of a variety of service offerings under, for example, the "software as services" or "software plus services" models.

Cloud services 120 may replace, supplement, or blend with features and capabilities provided by applications and software that run locally. Offerings may include, for example one or more of identity and directory services, device management and security, synchronized storage and data services across multiple devices or platforms, and services pertaining to activities and news. The cloud services 120 may be provided under a variety of different business models including free, advertising-supported, and subscription-based models.

As shown in FIG. 1, different client devices are present in the environment 100. In this example, a user has a PC 122 and a portable laptop computer 129 that are arranged to access the service resources 112 exposed by the cloud-based services platform 106 under the user's credentials, or identity (as indicated by reference numeral 125), which is trusted by the cloud services 120. Another user maintains a trusted identity 130 so that that user may couple a PC 136, a laptop computer 140, and a smart phone 144 to the Internet 117 to utilize the cloud services 120. For example, the first user might use the cloud services 120 for synchronizing the user's settings for favorite websites in a web browser application across both the PC 122 and laptop 129. The second user may take advantage of a service where all that user's photographs are synchronized across the PC 136, laptop 140 and phone 144 as well as with popular photo sharing sites on the Web that are maintained by third party providers.

It is emphasized that the client devices shown in FIG. 1 are merely illustrative and a variety of different devices may be utilized with the present ticket-based authorization model. These include for example, media center PCs, game consoles, set-top boxes, ultra-mobile computers, handheld game devices, mobile phones, PDAs (personal digital assistants), pocket PCs, personal media players such as MP3 players (Moving Pictures Expert Group, MPEG-1, audio layer 3), and similar devices.

Figure 2:
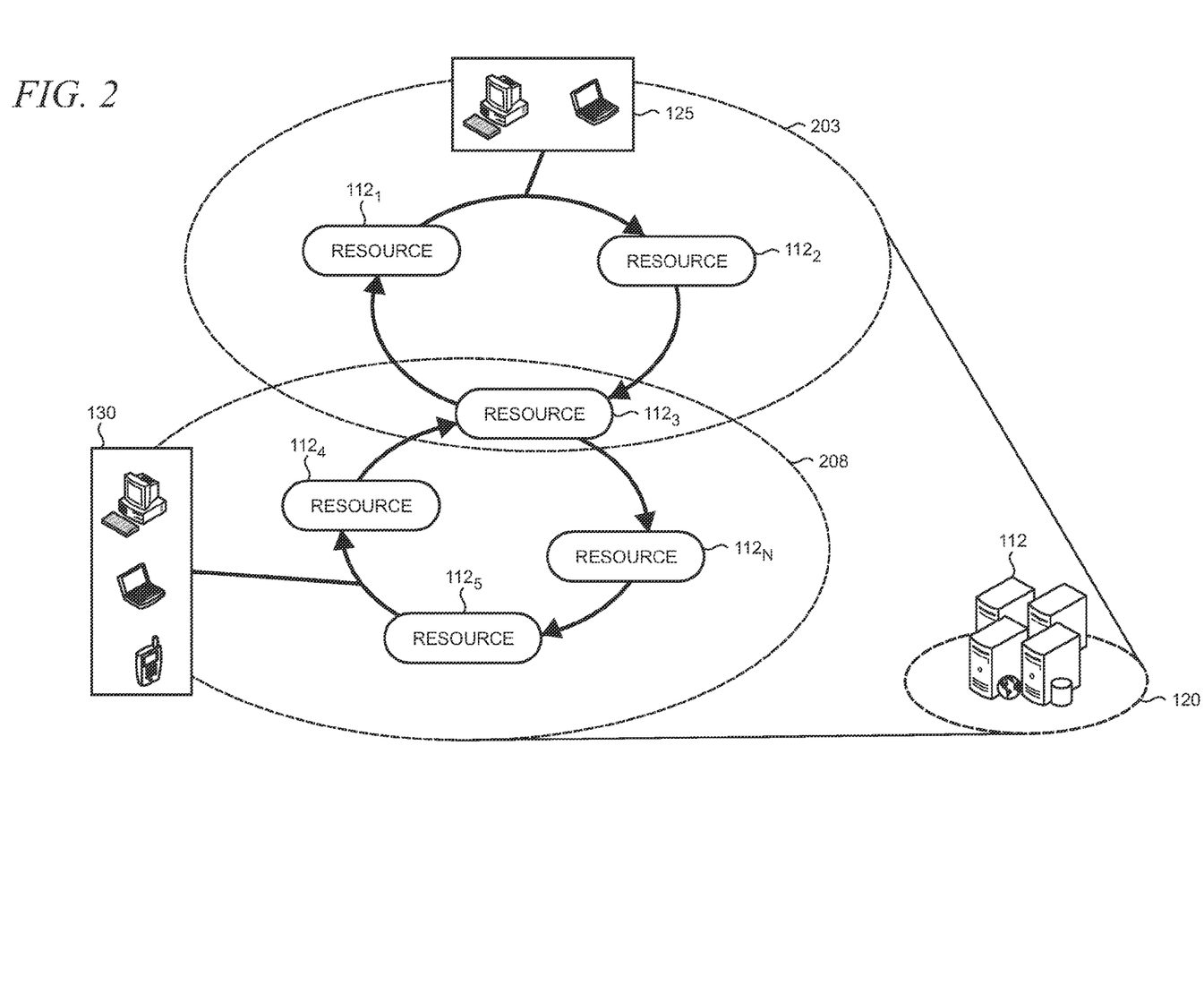
FIG. 2 shows how illustrative resources that are exposed by cloud-based platform services may be logically arranged in meshes.

As shown in FIG. 2, the resources 112 that are exposed by the cloud services 120 may be logically arranged to form meshes. In this example, a mesh is associated with each of the identities 125 and 130 (and the client devices associated therewith) as respectively indicated by reference numerals 203 and 208. The meshes include those resources which are utilized to implement a given service offering for the user and the devices which are associated with and can access the resource. In this example as shown, resources $112_1$, $112_2$, and $112_3$ are associated with the user having identity 125 and the user's PC 122 and laptop 129 in mesh 203. The user having identity 130 receives services that are implemented with mesh 208 which includes resources $112_3$, $112_4$, $112_5$ and $112_N$ that are accessible to the user's PC 136, laptop 140 and smartphone 144. For a service to be rendered, the meshes 203 and 208 must be traversed by a client device so that the resources 112 contained therein are accessed.

Meshes can overlap as shown in FIG. 2. In this example, resource $112_3$ is commonly utilized in both meshes 203 and 208. Resource $112_3$ could be, for example, a folder on the cloud to which one user as an owner has given the other user permission to access as a member. It is noted that the number of and configuration resources shown here in this example is arbitrary, and the particular resources used in a given mesh to implement a specific service offering for a user can be expected to vary to meet the needs of a particular scenario.

Figure 3:
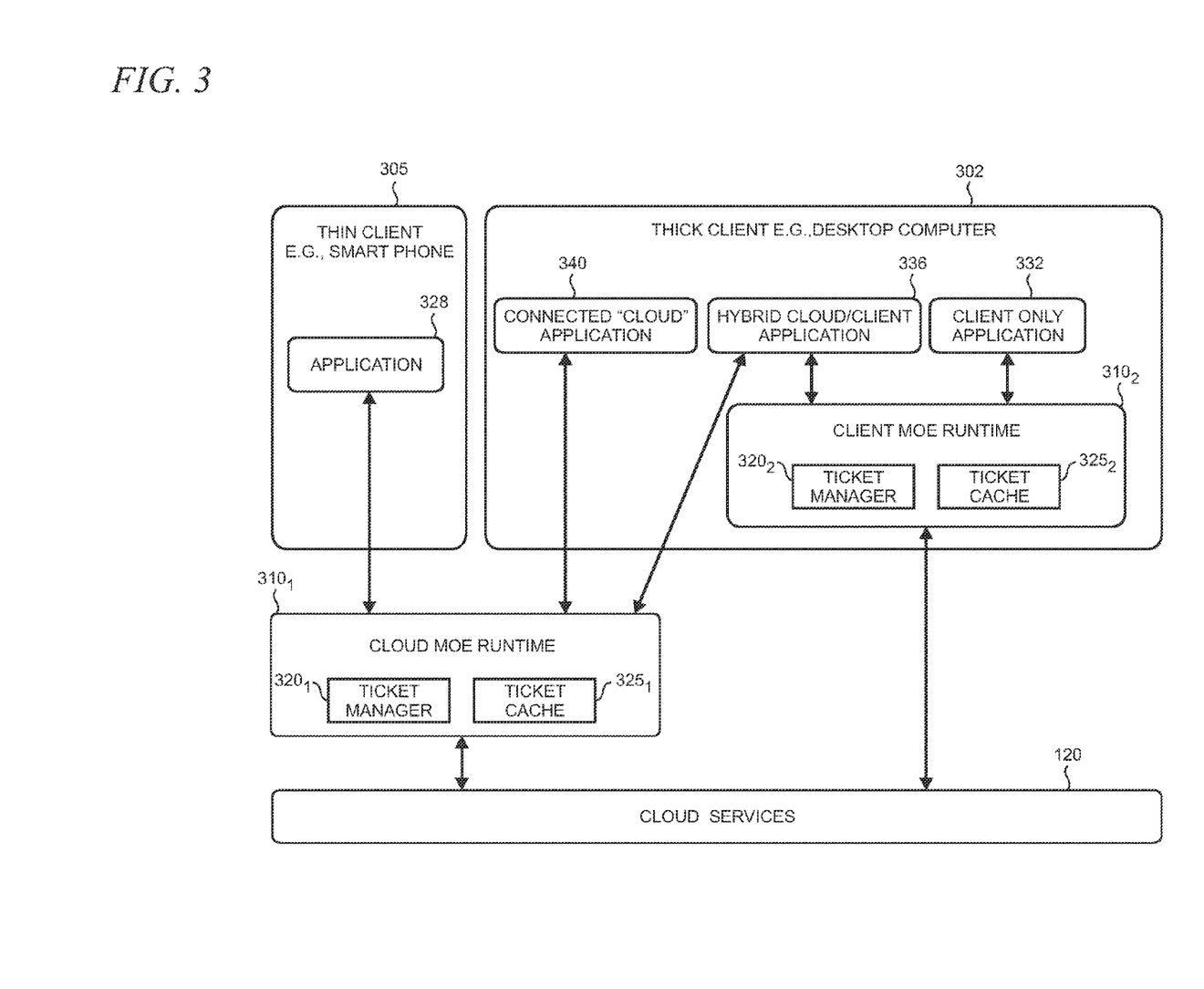
FIG. 3 shows an illustrative architecture that includes client devices, mesh operating environment ("MOE") runtimes, and cloud-based platform services.

To implement the present ticket-based authorization model, the illustrative architecture 300 shown in FIG. 3 is utilized. The architecture 300 distributes several functional components across the environment 100 (FIG. 1). In particular, an instance of a mesh operating environment ("MOE") runtime $310_1$ is located in the cloud as well as on the thick client devices in the environment 100. These thick clients 302 can include, for example, the PCs 122 and 136 and laptops 129 and 140. The thin client devices 305 such as the smart phone 144 will typically interact with the cloud MOE runtime $310_1$ while the thick client devices will host a client MOE runtime $310_2$.

Aside from their location in the environment 100, cloud MOE $310_1$ runtime and client MOE $310_2$ runtime may be similar in function and are generally arranged to expose services to help the applications running on client devices to create cached or offline-based experiences to reduce round trip interactions with the cloud services 120 or to enable the clients to morph data into a more consumable form. An illustrative application 328 is shown on the thin client 305 which interacts solely with the cloud MOE runtime 310. Applications on the thick client 302 in this example representatively include a client only application 332 which interacts only with the client MOE runtime $310_2$ while a hybrid cloud/client application 336 interacts with both the client MOE runtime $310_2$ and cloud MOE runtime $310_1$. A connected "cloud" application 340 on the thick client 302 interacts solely with the cloud MOE runtime 310.

Figure 4:
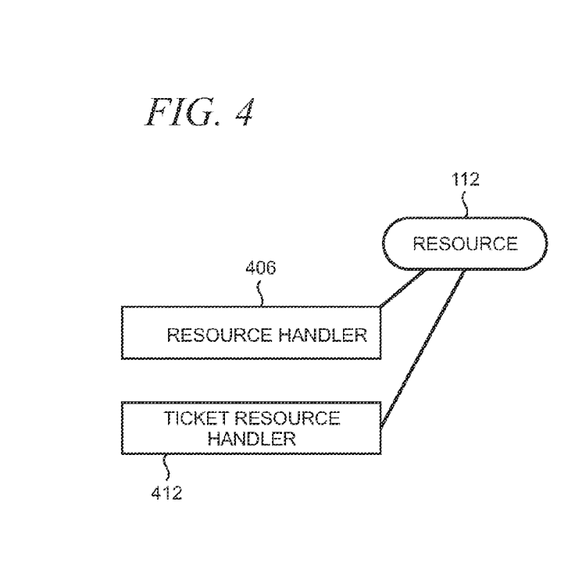
FIG. 4 shows an illustrative resource handler and ticket resource handler that are associated with a resource.

To support the present ticket-based authorization, the cloud MOE runtime $310_1$ and client MOE runtime $310_2$ expose a ticket manager (as respectively indicated by reference numerals $320_1$ and $320_2$), and associated ticket caches $325_1$ and $325_2$. The ticket manager 320 is configured to interact with the resources 112 used to implement the cloud services 120 to be able to locate and retrieve the correct authorization tickets and cache them in the cache 325 for future calls to the service by the clients. The ticket manager 320 interacts with the resources 112 through a resource handler 406 and ticket resource handler 412 that are associated with a resource 112 as shown in FIG. 4.

More specifically, the ticket manager 320 is arranged to work with two types of tickets. The first ticket type is a principal ticket which is used to authenticate a security principal which may represent either a device or an identity. The second ticket type is a claim ticket that may be optionally utilized in most cases, but will provide some performance benefits when they are used by avoiding the database lookups that are typically required when only using principal tickets.

Figure 5:
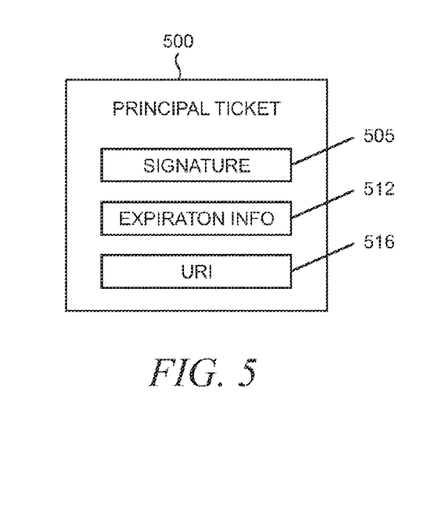
FIGS. 5 and 6 show, respectively, an illustrative principal ticket and an illustrative claim ticket.
Figure 6:
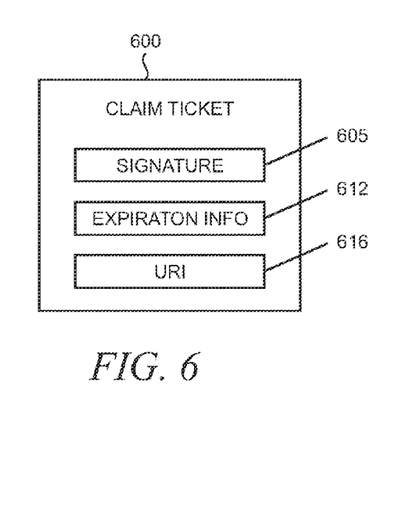

As shown in FIGS. 5 and 6, both the principal ticket 500 and claim ticket 600 are structured the same way and may be expressed using conventional data formats such as Security Assertion Markup Language ("SAML") from the Oasis Security Services Technical Committee. Each ticket includes a signature field, respectively indicated by reference numerals 505 and 605, expiration information 512 and 612, and a URI 516 and 616 to identify the ticket by its associated resource. The tickets 500 and 600 are signed by an authority for the resource to enable the cloud services 120 to verify their authenticity. The expiration information typically specifies a date and time at which the ticket is no longer valid.

Figure 7:
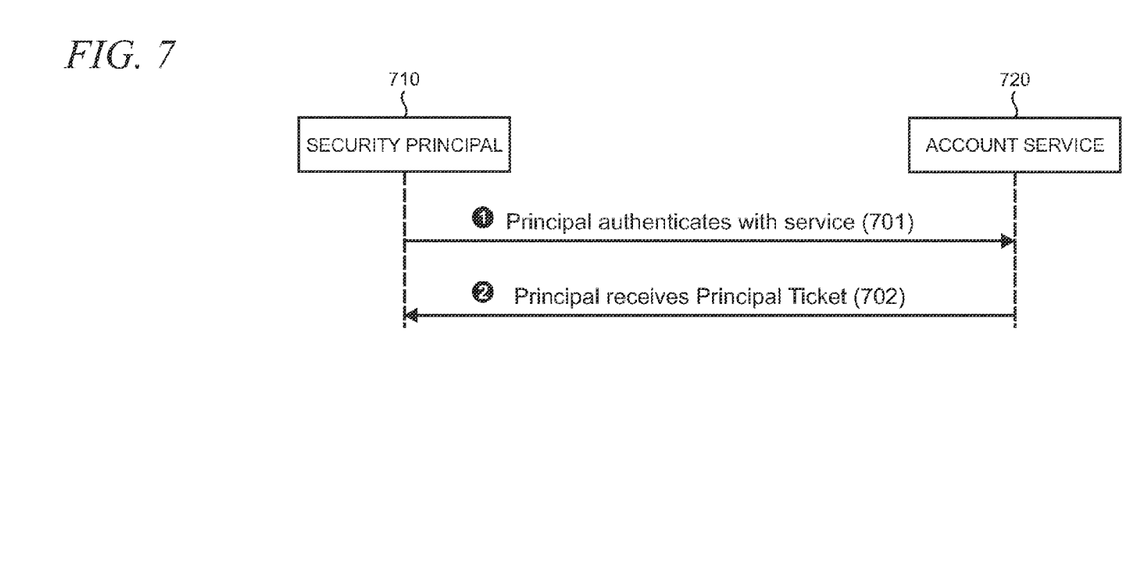
FIG. 7 is a data flow diagram that shows an illustration authentication between a security principal and an account service.

As shown in FIG. 7, a call (701) such as an HTTP (Hypertext Transfer Protocol) GET call from the security principal 710 to an account or identity management service 720 will result in principal tickets being returned as inlined objects (702). Such service 720 may itself be arranged as a resource on either the cloud-based services platform 106 shown in FIG. 1, or be supported by a separate cloud altogether. Principal tickets are configured to be standalone in the ticket-based authorization model in most cases (with the exception of mesh peer connectivity, as described below). So, if the caller (i.e., the security principal) has only principal tickets, the cloud service 120 will still be able to authenticate the principal and perform a database lookup to check if it has access to a given resource. For example, a storage service in the cloud can check if a client device (authenticated by its principal ticket) may access a storage resource (e.g., a folder) by looking up in the database if this device is claimed by the owner/member of this resource.

The authorization checks can be expensive in terms of overall performance of the cloud service 120. To mitigate such performance loss, a claim ticket may be optionally utilized which describes certain facts about the security principal. When a resource handler receives a principal ticket along with the claim ticket, it can avoid a database lookup to see if a given caller has access to a device or the device has access to the resource. For example, the claim ticket may describe the fact that some user has claimed some device.

When a resource requires a claim ticket for access, the requirement is expressed by including the URI of the required ticket as an attribute on links to the resource. One example where a claim ticket is needed to access a resource is peer connectivity between meshes. For example, using the storage service example above, a claim ticket is used to enable an authorized, but restricted link to be established between a mesh for the retrieving device and a mesh for the target device. This allows the retrieving device to navigate a portion of the mesh of the target device, such as a folder employed by the storage service.

A link to a resource may also optionally include the inline value of the required claim ticket, as an attribute of the link. This eliminates the need for the client to issue an additional HTTP operation in order to obtain any tickets that it needs. In the absence of an explicit claim ticket requirement, a client simply supplies its principal ticket when issuing a request against a resource. An exemplary link is shown below:

```
<link href=http://host.com/SomeResources/ID
    claimsUri=http://host.com/SomeResources/ID/SomeClaimTicketHandler
    claimsValue="<XML with SAML/> encoded for being embeddable
into XML (with ampersands)
/>
``` where link attributes include:

claimsUri—a URI where a caller can retrieve a list of claims for a given resource (represented by its link); and claimsValue—a set of claim tickets for a given resource (represented by its link) in SAML format (encoded in Base64) that should be used to access this resource. This set of claim tickets is passed along with a principal ticket in authorization header of an HTTP call. A principal ticket and following claim tickets are separated by commas in the authorization header.

If several links have the same claimsValue in them, then it is not necessary to add claimsValue to all links, and instead include it only on a first link. As all other links always have claimsUri attributes as pointers, the client will be able to find a correct claimsValue from previous links that have this attribute set.

Figure 8:
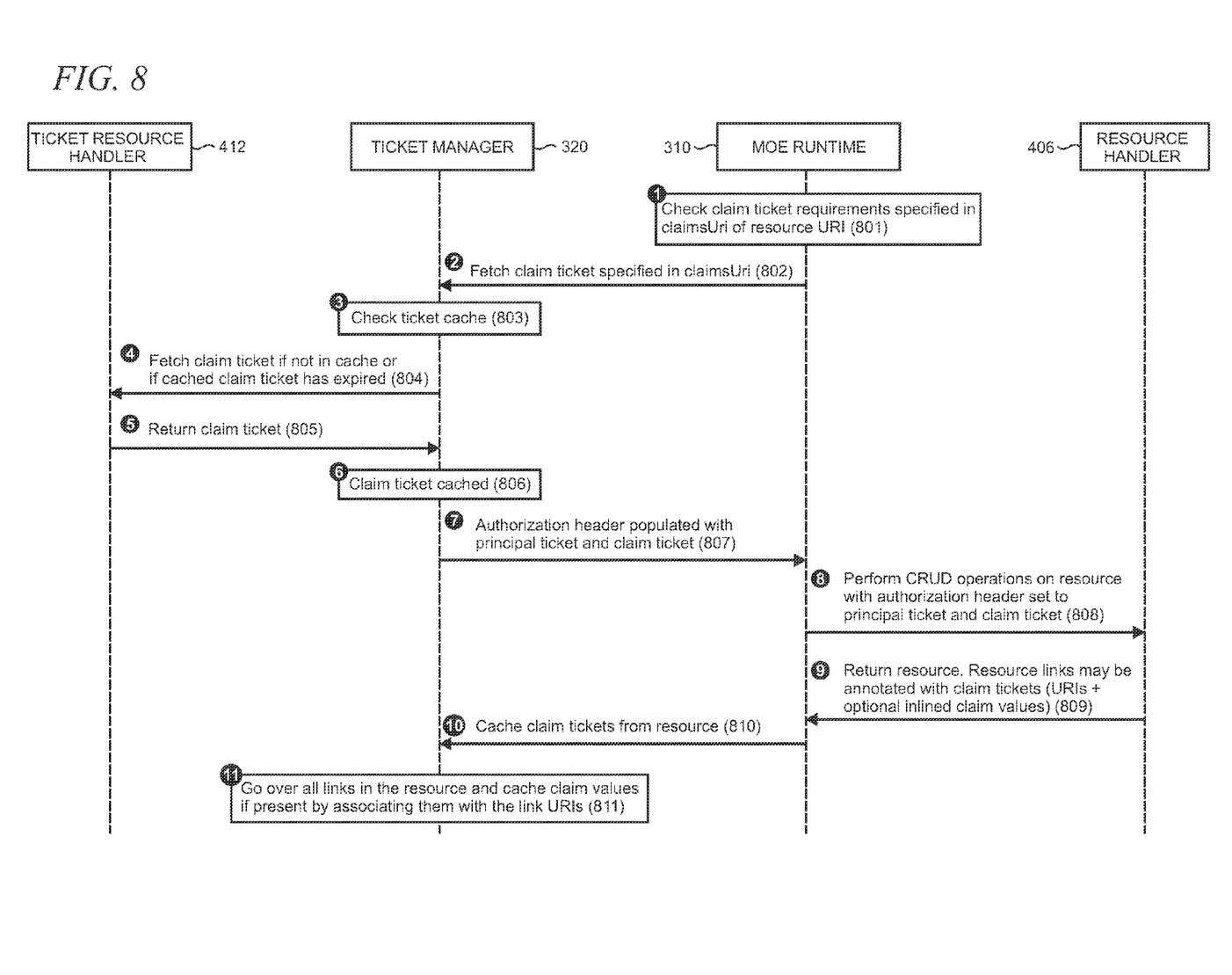
FIG. 8 is a data flow diagram that shows an illustrative scenario in which a resource is accessed using a principal ticket and one or more claim tickets.

FIG. 8 is a data flow diagram that shows an illustrative scenario in which a resource is accessed using a principal ticket and one or more claim tickets. When a security principal (i.e., an identity or device associated with a user) wishes to navigate to a resource supported by the cloud service 120 (FIG. 1), the MOE runtime 310 will check the claim ticket requirements specified in the claimsUri attribute of the resourceURI (801) and will check with ticket manager 320 to fetch the specified claim ticket (802).

The ticket manager 320 will check its ticket cache 325 for the specified claim ticket (803) using the URIs in the claim tickets to identify them. If the claim ticket specified in the claimsURI is not cached, or a cached claim ticket has expired, then the ticket manager will fetch the claim ticket from the ticket resource handler (804). Otherwise, the process continues at step 7 shown in FIG. 8.

The ticket resource handler 412 will return the claim ticket (805) which the ticket manager 320 will put into the ticket cache 325 (806). The authorization header of an HTTP call is populated with the principal ticket and claim ticket (807). The MOE runtime may then perform various HTTP CRUD (create, read, update, delete) operations against a resource with the authorization header set to the principal ticket and claim ticket (808) which will be received at the resource handler 406.

The resource is returned (809) and the resource links may be annotated with claim tickets (i.e., claim ticket URIs plus optional inlined claim values) (809). The MOE runtime 310 will interface with the ticket manager 320 so that the claim tickets from the resource are cached in the ticket cache 325 (810). The ticket manager 320 will go over all the links in the resource and cache the claim values (if present) by associating them with the link URIs (811).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for implementing a self-describing authorization policy for resources provided by a cloud service, the method comprising:

exposing resources provided by the cloud service as one of a plurality of resource meshes, each resource mesh including a plurality of resources that require authenticating credentials associated with a particular client device to access the resources;

providing a principal ticket including a link to a particular resource in a mesh and credentials for authenticating a client device to the particular resource in the mesh associated with the client device to permit the client device to access the resource;

annotating the link to the particular resource with authorization credentials required by at least one other resource in the resource mesh associated with the particular client device to permit the client device to access the other resource, the authorization credentials for the other resource comprising a claim ticket containing at least one assertion providing access to the other resource; and accessing the particular resource by using the principal ticket included in the link to the particular resource, the link being annotated with at least one claim ticket required by another resource to permit the client device to directly access the other resource when accessing the particular resource.

2. The method of claim 1 in which the annotating includes expressing the credentials by including a URI for a claim ticket as an attribute on the link.

3. The method of claim 2 further including providing an inline value of the claim ticket as an attribute on the link.

4. The method of claim 3 in which at least one resource mesh includes at least one resource that does not require a claim ticket.

5. The method of claim 4 further including permitting access to a resource with only the principal ticket when the resource does not require a claim ticket to access another resource.

6. The method of claim 5 in which plural client devices comprise a single identity authenticated by the same principal ticket.

7. The method of claim 6 in which principal tickets and claim tickets are signed by an authority and are each expressed using SAML.

8. The method of claim 7 in which the authority is an owner or member of the resources associated with the principal tickets and claim tickets.

9. The method of claim 1 in which at least one resource included in at least two resource meshes can be accessed by a plurality of different client devices having different authenticating credentials.

10. A computer-readable medium not comprising a propagated signal and containing instructions which, when implemented by one or more processors disposed in an electronic device, implements a client device for navigating between resources provided by a cloud service as one of a plurality of resource meshes, each resource mesh including a plurality of resources that require authenticating credentials associated with a particular client to access the resources, wherein the instructions provide a runtime for accessing a particular resource in a resource mesh associated with the client device by using an attribute of the particular resource and for checking the attribute to determine if the particular resource requires access to another resource in the mesh, the runtime comprising a ticket manager configured for:

checking a ticket cache associated with the ticket manager to determine the availability in the ticket cache of a claim ticket with authorization credentials required for the client device to access the other resource in the resource mesh, if the claim ticket is not available in the cache, fetching the claim ticket from a ticket resource handler provided by the cloud service using an attribute in a link to the particular resource, and storing the fetched claim ticket in the ticket cache, wherein the runtime is configured to obtain from the cloud service a principal ticket usable by the runtime for authenticating the particular client device to access the particular resource, wherein the principal ticket includes a link to the particular resource and the ticket manager annotates the link with the claim ticket required by the other resource.

11. The computer-readable medium of claim 10 in which the runtime is a mesh operating environment runtime, and the ticket manager and the mesh operating environment runtime are instantiated in one of a client device operated by a user and a platform in the cloud.

12. The computer-readable medium of claim 11 in which the cached claim tickets are identified by URI.

13. The computer-readable medium of claim 12 in which the principal ticket and specified claim tickets populate an HTTP authorization header.

14. The computer-readable medium of claim 13 in which the runtime performs HTTP CRUD operations on the particular resource through a resource handler.

15. The computer-readable medium of claim 14 in which the attribute includes a URI where the client can retrieve a list of claim tickets.

16. The computer-readable medium of claim 15 in which the attribute includes claim ticket values that are usable for accessing the other resource.

17. The method of claim 12 in which claim tickets include expiration information and access to other resources is denied when a received claim ticket is expired.

18. The method of claim 17 in which the client device is selected from one of a thick client having resident thereon a ticket manager for interacting with the resource mesh for fetching tickets and a thin client having resident thereon an application for fetching tickets using a remote mesh operating environment runtime.

19. The method of claim 18 further including a plurality of resource meshes, each including a plurality of resources, wherein at least one claim ticket is specified by the URI for a common resource located in more than one mesh and access is provided to the common resource by different client devices having different authentication credentials associated with each mesh by respective principal tickets using peer connectivity.

20. The computer-readable medium of claim 10 in which the runtime obtains a principal ticket from an account service by presenting thereto authenticating credentials of the particular client device.

* * * * *